Patented July 15, 1924.

1,501,840

UNITED STATES PATENT OFFICE.

CAMILLE DEGUIDE, OF ENGHIEN, FRANCE.

PROCESS FOR THE MANUFACTURE OF BARIUM CYANIDE.

No Drawing.   Application filed December 4, 1923.  Serial No. 678,527.

*To all whom it may concern:*

Be it known that I, CAMILLE DEGUIDE, a subject of the King of Belgium, and a resident of Enghien, Department of Seine-et-Oise, France, have invented certain new and useful Improvements in a Process for the Manufacture of Barium Cyanide, of which the following is a specification.

The manufacture of barium cyanide by causing nitrogen to pass at a high temperature over a mixture of carbon with barium carbonate, was proposed a long time ago by Margueritte and Sourdeval. The following reaction explains the process:—

$$BaCO_3 + 4C + 2N = Ba(CN)_2 + 3CO.$$

The greatest practical difficulty in this operation resides in the fact that the barium carbonate melts before the reaction commences; this results in rapid destruction of the furnaces employed, large consumption of fuel, and considerable loss of barium, the last-mentioned substance combining with the refractory materials of the furnace.

The process of the present invention enables these different inconveniences to be avoided; it consists in mixing with the barium carbonate and the carbon, which are to react with the nitrogen, a calculated quantity of bibarytic silicate $(SiO_2.2BaO)$ in order to obtain or produce a mixture which is infusible at the temperature of formation of the barium cyanide.

In practice, a mixture of even one molecular proportion of bibarytic silicate with one of barium carbonate and the carbon, is sufficient for the reaction to give good results.

The advantages of the present process are:

(1) Obtaining a non-fused mass,
(2) Economy of barium carbonate,
(3) Possibility of employing rotating furnaces of high yield,
(4) Economy of fuel.

The barium cyanide obtained, mixed with barytic silicate and other substances, such as carbon in excess, undecomposed barium carbonate, etc., can serve either for the manufacture of synthetic ammonia or the manufacture of alkali cyanides.

What I claim is:

A process for the manufacture of barium cyanide by heating barium carbonate and carbon in the presence of nitrogen, consisting in mixing, with the barium carbonate and the carbon, a quantity of bibarytic silicate so calculated as to produce a mixture which is infusible at the temperature of formation of the barium cyanide.

In testimony whereof I have signed my name to this specification.

CAMILLE DEGUIDE.

Witnesses:
J. ARMENGAUD, Aîné,
H. DEFÉVRIMONT.